United States Patent [19]

Hill et al.

[11] 4,068,453
[45] Jan. 17, 1978

[54] DRIVE SYSTEM FOR HAY HARVESTING AND CONDITIONING MACHINE

[75] Inventors: Amos Hill, Newton, Kans.; Warner M. Heckley, Rockford; Gerald F. Richards, Celina, both of Ohio

[73] Assignee: Avco Corporation, Coldwater, Ohio

[21] Appl. No.: 700,328

[22] Filed: June 28, 1976

[51] Int. Cl.² ............................................. A01D 45/00
[52] U.S. Cl. .................................. 56/14.4; 56/DIG. 1
[58] Field of Search ...................... 56/1, DIG. 1, 14.4, 56/14.2

[56] References Cited

U.S. PATENT DOCUMENTS

| 3,146,569 | 9/1964 | Hale et al. ................................. 56/1 |
| 3,672,135 | 6/1972 | Peacock et al. ...................... 56/14.2 |
| 3,722,190 | 3/1973 | Fisher ........................................ 56/1 |
| 3,747,310 | 7/1973 | Calder ........................................ 56/1 |

Primary Examiner—Russell R. Kinsey
Attorney, Agent, or Firm—Charles M. Hogan; Robert J. McNair, Jr.

[57] ABSTRACT

A tractor-drawn and powered hay harvester and conditioner has a box-type frame to which a pair of wheels are rigidly attached. The frame supports a sickle bar cutter and journals both a pick-up reel and a pair of ribbed crop conditioner rolls which crimp and flatten the stems of the hay cuttings, thereby facilitating curing and drying. A novel power drive subsystem is featured which enables both control of cutter bar height above ground and automatic adjustment of the spacing between the crop conditioner rolls as a function of crop density.

7 Claims, 8 Drawing Figures

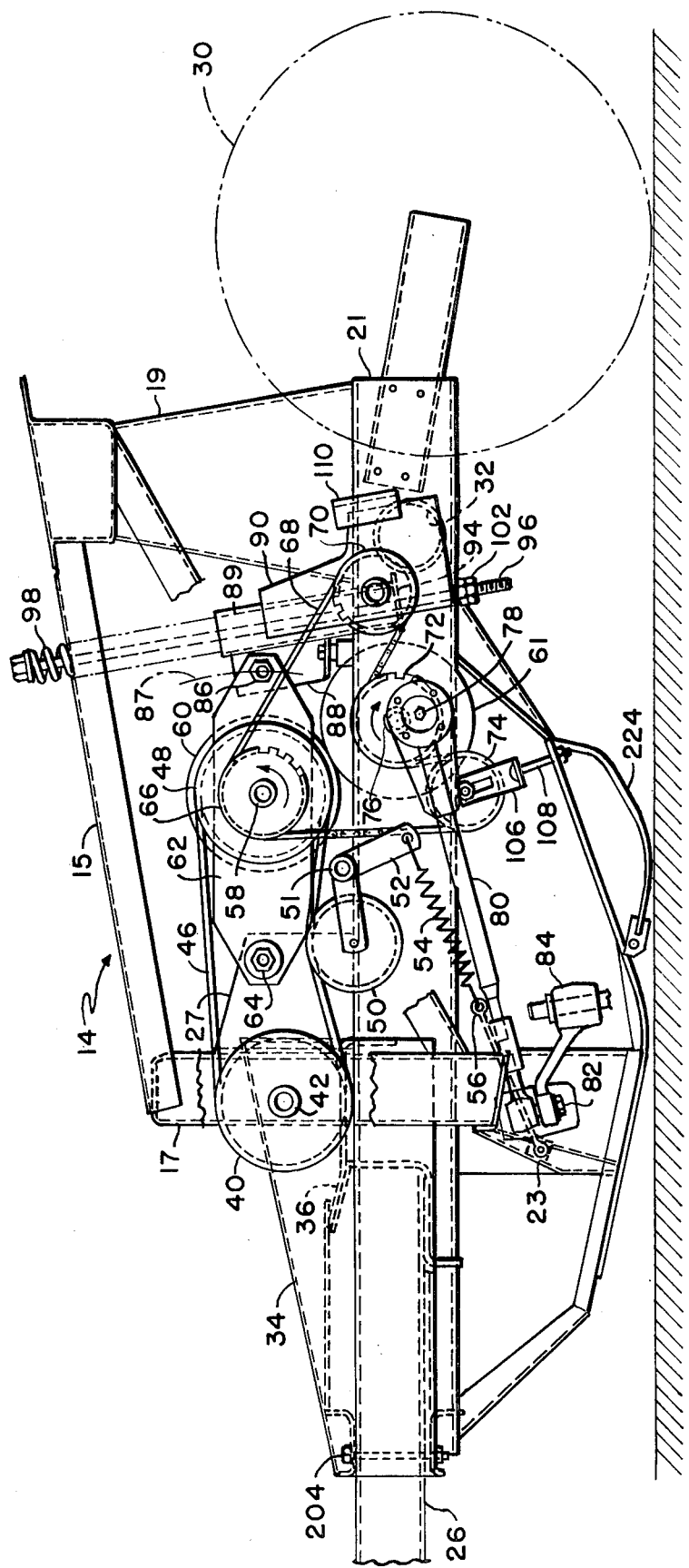

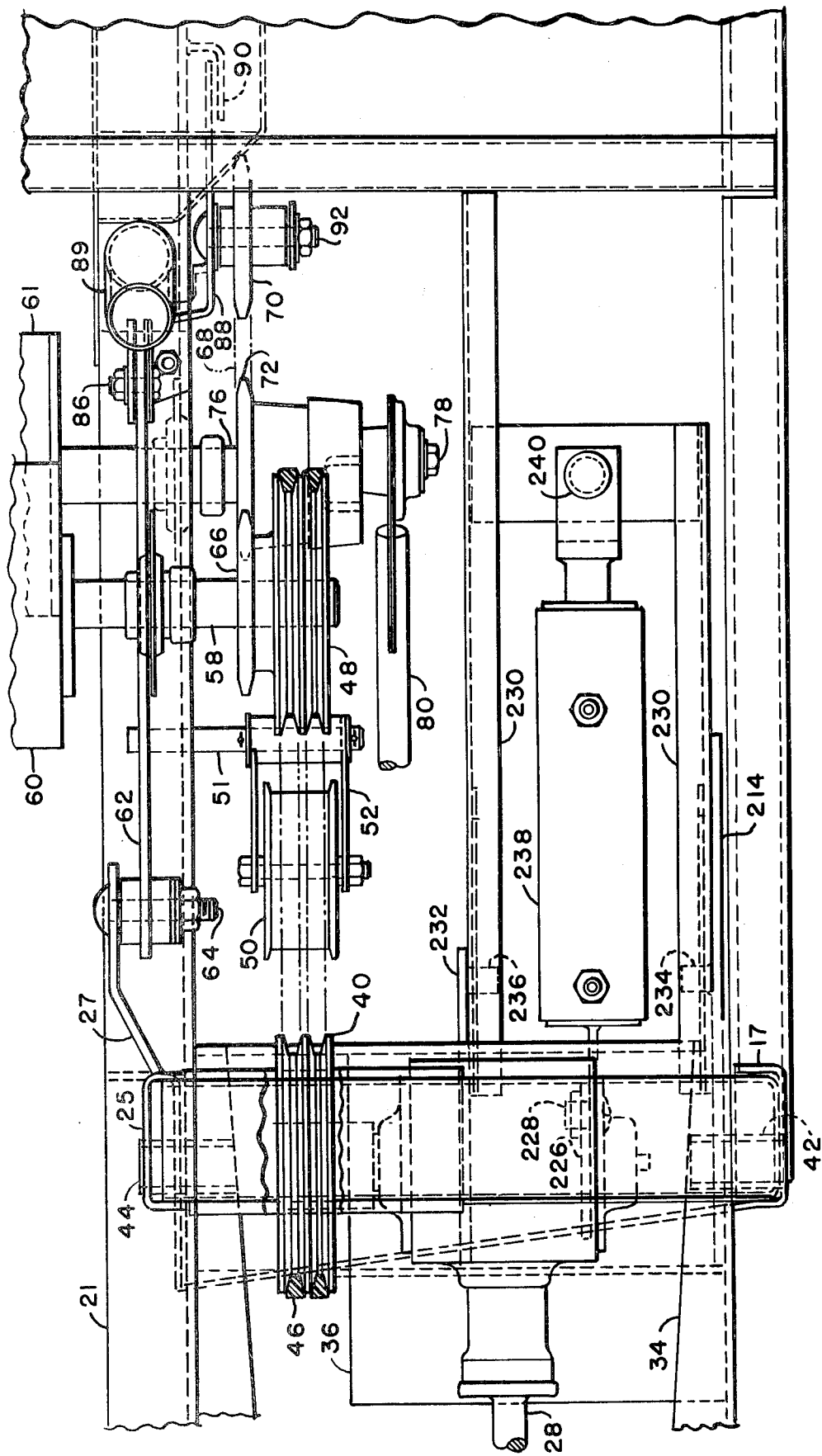

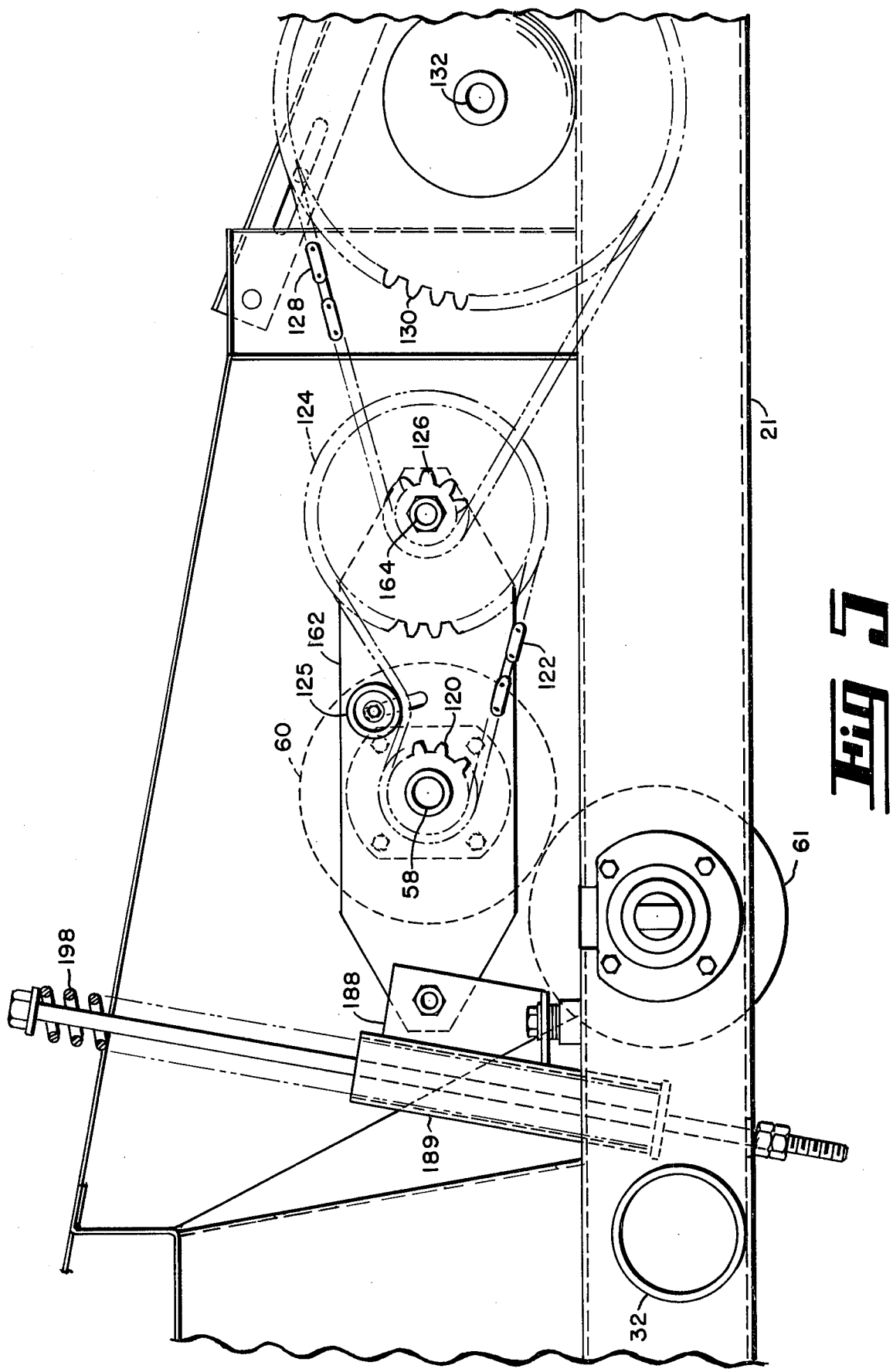

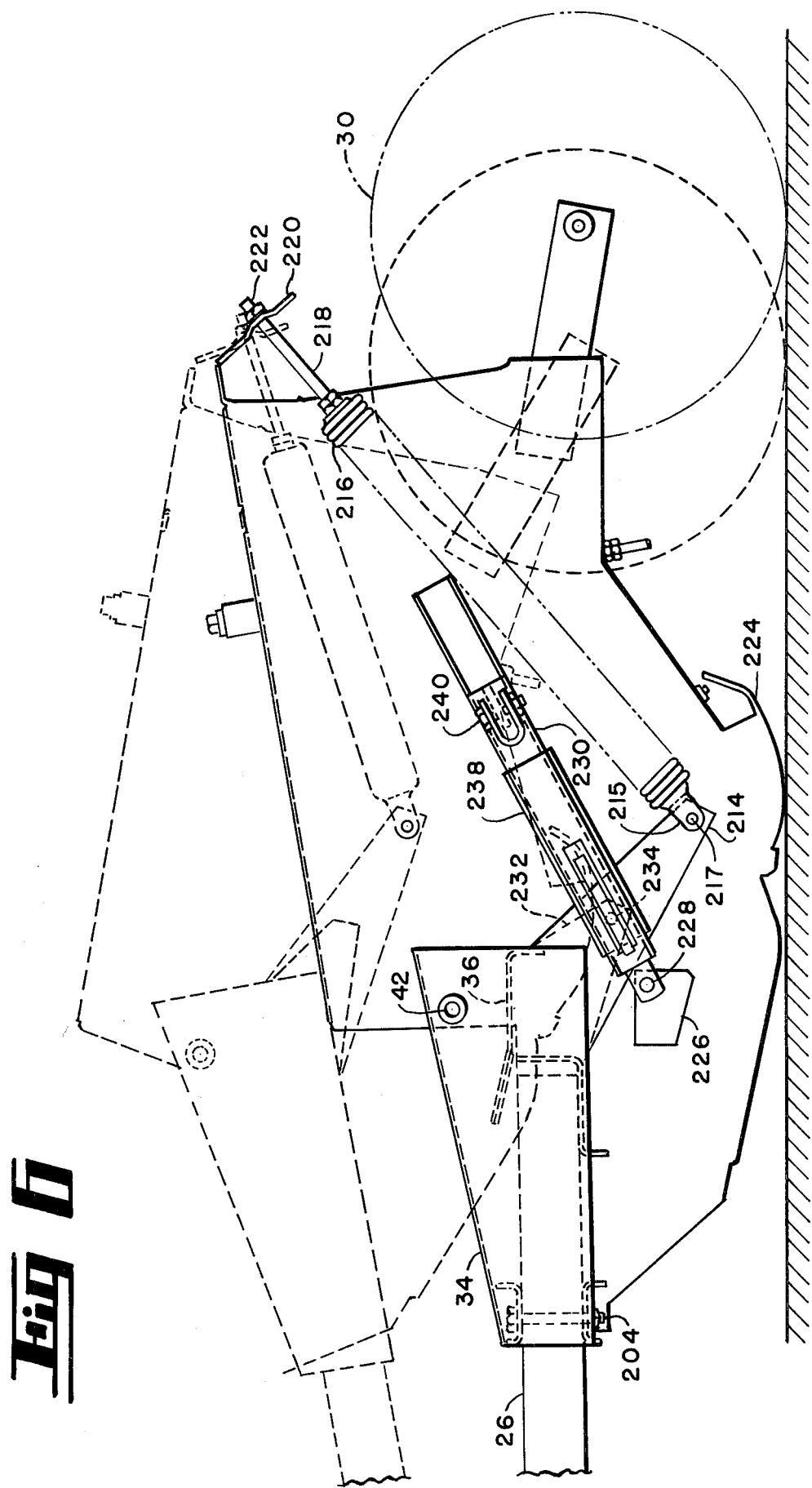

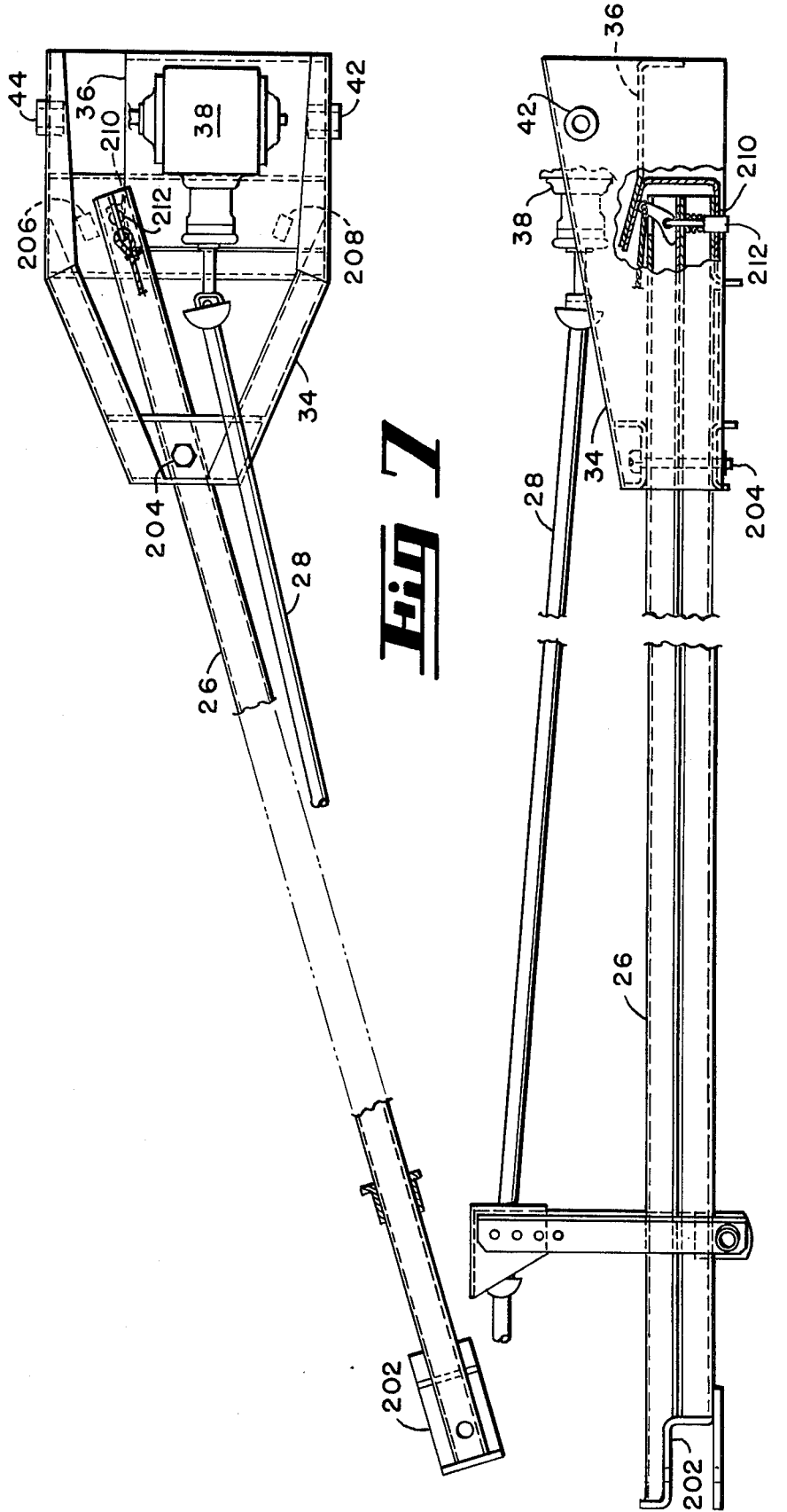

DRIVE SYSTEM FOR HAY HARVESTING AND CONDITIONING MACHINE

BACKGROUND OF THE INVENTION

The present invention relates generally to crop harvesting and conditioning machines. More specifically, the invention relates to means for driving the crop conditioning rolls of such a machine so that they remain properly indexed one with the other while at the same time allowing the axial spacing between rolls to be self-adjusting to accommodate for variations in the quantity of crop cuttings passing between the rolls. Throughout a wide range of roll spacing, tension in the drive chain is maintained at a uniform value. Further, by placing the axis of the power transmission at the pivot point the header suspension mechanism control of the height of the cutter bar above ground is maintained both during field use and while in the transport mode.

Combination mower and crop conditioner machines have been disclosed in the past. Examples of prior art configurations are the machines covered by U.S. Pats. Nos. 3,300,953; 3,309,850; 3,729,907; 3,747,310 and 3,797,207. U.S. Pat. No. 3,300,953 to Glass deals with drive means for a hay harvesting machine having a mower, a crop gathering reel and a pair of crop conditioning rolls. U.S. Pat. No. 3,309,850 to Glass et al. shows means for biasing a movable hay conditioning roll so that it adjusts to provide a proper roll-to-roll pressure in compensation for different crop conditions. U.S. Pat. No. 3,729,907 to Burrough et al. covers a power drive train for a mower-conditioner which is said to have improved simplicity over the previous art. The hay conditioner drive mechanism disclosed by Calder in U.S. Pat. No. 3,747,310 shows one approach for allowing one conditioning roll to move toward and away from the other roll to accommodate the varying thickness of the crop passing between the rolls. U.S. Pat. No. 3,797,207 to Sawyer et al. deals with the frame construction and header suspension mechanism of a mower-conditioner machine.

While the prior art mover-conditioner machines are generally satisfactory, none has the features of my invention. The rolls of my invention remain properly indexed and are driven in timed synchronism throughout a substantial range of spacing, while uniform drive-chain tension is maintained. The need for a simple subsystem to perform this function arises because the upper roll is made of a resilient material having a multiplicity of circumferentially spaced ribs. The lower roll (journaled on a fixed axis in the sidewall ends of the frame) is made of a rigid material with a rib formation that complements that of the upper roll. In operation the two rolls must register rib-to-rib at all times and drive chain tension maintained so that an intermittent crushing action is exerted on the stalks of crops passing between the rolls. U.S. Pat. application Ser. No. 637,190, filed Dec. 3, 1975, entitled "Crop Conditioner Roll Structure", and assigned to the same assignee as this invention, describes the roll configuration.

In driving a pair of rolls which must always register rib-to-rib, it has been discovered that the arrangement of the power drive train relative to the pivot axis of the movable roll becomes an important factor. My invention provides a solution for this problem and embodiments thereof are capable of being readily adjusted to provide adequate roll pressure under all crop conditions.

The power drive arrangement also allows for a novel arrangement of the suspension mechanism. Various frame and suspension configurations have been employed in the past. U.S. Pat. No. 3,797,207 and the references cited therein typify what has already been done. My invention presents a solution to the problem of transmission positioning which results in a simpler and hence more reliable power drive train than previously existed.

SUMMARY OF THE INVENTION

A tractor-drawn and powered crop harvesting and conditioning machine is disclosed which comprises a transversely arranged header assembly having a drawbar coupling and tongue mounted on one end thereof. The header assembly includes: a torque tube and box girder main frame having spaced apart sidewalls, a pair of ground-engaging wheels rotatably mounted so that there is one located at the lower rear edge of each frame sidewall, a sickle mower along the lower front edge of the frame, a crop gathering reel assembly operable to sweep the hay over the sickle and into a pair of ribbed crop conditioning rolls, thereby affording crop harvesting and conditioning in one operation. The lower crop conditioning roll is journaled on a fixed axis in the sidewall end of the frame whereas the upper crop conditioning roll is mounted on journals which swing so that the upper roll is relatively separable and self-adjusting with respect to the lower roll as a function of crop density. A single chain drive entrained on the sprockets and used in conjunction with an idler sprocket moving in unison with the upper roll, maintains proper indexing of the two crop conditioning rolls. Adjustable cutting height and a road transport mode are provided by inclusion of a pivoting arrangement between the header assembly and the drawbar coupling mechanism.

BRIEF DESCRIPTION OF THE DRAWINGS

The preferred embodiment of my invention will be described by reference to the accompanying drawings wherein:

FIG. 2 is an enlarged scale left side view of the machine with portions removed for clarity, showing the frame structure and the arrangement of the drive mechanism;

FIG. 3 is a top view of the drive assembly showing the position of the power transmission relative to the main driving belt;

FIG. 5 is an enlarged fragmentary view of the right side of the mower-conditioner showing the drive mechanism for rotating reel assembly;

FIG. 6 is a fragmentary view of the left side of the machine showing the height control mechanism both in its lowered operating position and in the raised transport mode;

FIG. 7 is a top view of the tongue and power drive assembly showing provision for three tongue positions; and FIG. 8 is a side view of the tongue and power drive assembly showing the pivotal mount attaching the assembly to the main frame of the mower-conditioner.

DESCRIPTION OF PREFERRED EMBODIMENT

Figure 1:
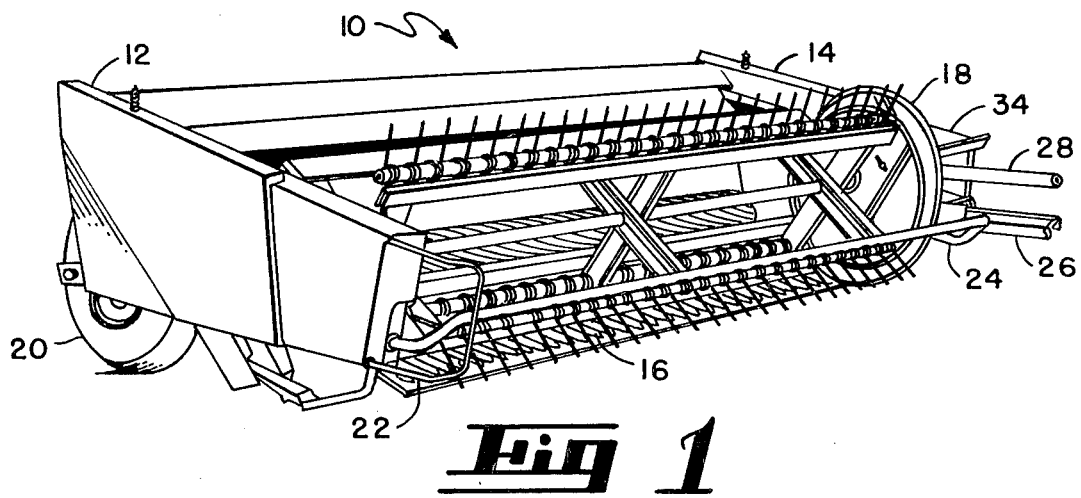
FIG. 1 is a generally frontal perspective view of a typical mower-conditioner constructed in accordance with the principles of the invention.

In the description which follows, the right and left sides of the mower-conditioner refer to the sides as seen from the rear when facing in the direction of travel of the tractordrawn machine. In the perspective view of FIG. 1, the near side is the right side of the machine and the far side is the left side. More specifically, the mower-conditioner 10 comprises a main frame having a pair of spaced apart side walls 12 and 14, a sickle mower 16 at the lower front edge, a tine reel 18, a pair of conditioning rolls 60 and 61 (FIG. 2) parallel with and to the rear of the tine reel, a pair of transport wheels, with wheel 20 being the right one thereof, crop divider 22, push bar 24, implement tongue 26 and drive shaft 28.

Referring now to FIGS. 2 and 3, there is shown the power drive mechanism at the left side of the mower-conditioner. Left side wall 14 is shown, as are the end frame members 15, 17, 19 and 21, which support the sidewall on main torque tube frame member 32. Tongue assembly 34 serves as the companion mount for tongue stub 26 shown in FIG. 1. Shelf 36 which is integral with tongue subframe assembly 34 serves to support drive transmission 38. Double sheaved pulley 40 is mounted on a shaft included in transmission 38. Pins 42 and 44 (FIGS. 2, 3 and 6) pivotally mount and entire tongue subframe assembly to the end frame members of the mower-conditioner. The pivotal mounting is axially aligned with the axis of pulley 40.

Flexible drive belt 46 carries power from pulley 40 to sheaved pulley 48, located aft of pulley 40. Tension in the belt is maintained by means of idler pulley 50 which is rotatably mounted on bracket member 52. Bracket member 52 is pivotally mounted by pin 51 to the frame and thrusts upwardly so that tension is exerted on the belt via idler 50, biased by spring 54 which is anchored to a frame member 23 by eye bolt 56.

Pulley 48 is mounted on shaft 58 which extends from the end of the upper crop conditioning roll 60 (shown in outline form in FIG. 2). Shaft 58 is rotatably journaled in plate 62. Plate 62 is pivotally mounted by means of stud 64 and bracket 27 that extends from the sidewall of frame member 25. This member 25 is secured to the frame including member 21 (FIG. 3).

Coaxially mounted with pulley 48 is a sprocket gear 66. Sprocket gear 66 is in engagement with sprocket chain 68 which also rides on and around the lower periphery of first idler sprocket 70, the upper periphery of sprocket 72 and the lower periphery of second idler sprocket 74. Sprocket 72 is mounted on shaft 76 which extends from the center of the lower crop conditioning roll 61. Shaft 76 is rotatably journaled in the sidewall of the mower-conditioner frame. There is also mounted on shaft 76 an eccentric offset 78 on the outer end of which is journaled one end of pitman bar 80. The other end of pitman bar 80 is connected to bell crank arm 84 via ball and nut assembly 82. Bell crank arm 84 drives the sickle bar (not shown) in a conventional manner.

With the mechanisms shown in FIGS. 2 and 3, power from the power take-off 28 of the tractor is delivered via transmission 38 to flexible belt 46. Belt 46 drives upper crop conditioning roll 60 and by means of sprocket chain 68 and idler sprockets 70 and 74, turns sprocket gear 72 and lower crop conditioning roll 61. The two crop conditioning rolls remain properly indexed, one with the other because of the use of the sprockets and a chain. As the lower crop conditioning roll 61 rotates on its axis, the sickle bar 16 is made to oscillate back and forth once per revolution of the conditioning roll.

Figure 4:
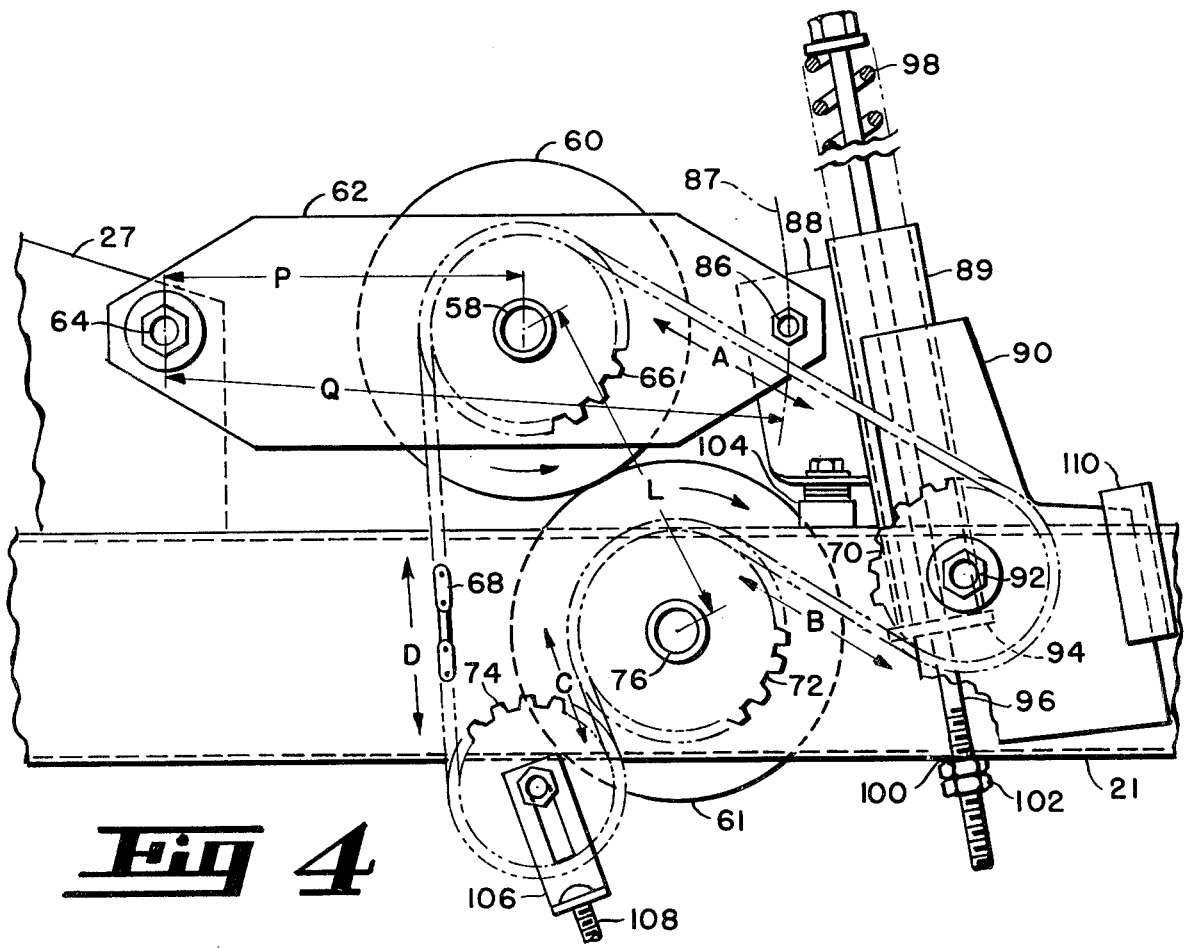
FIG. 4 is an enlarged view of a portion of FIG. 2, showing the manner in which the chain drive responds to roll separation.

My invention relates to the means by which separation of the crop conditioning rolls is accomplished. In the machine containing my invention the upper crop conditioning roll 60 moves closer to or further away from the lower conditioning roll 61 which is journaled for rotation at a fixed location in the frame sidewalls. The journaled ends of the upper roll are mounted in assemblies which are relatively movable and self-adjusting with respect to the lower roll so as to accommodate passage of crops of variable density and character between the rolls. The means for accomplishing this is shown in FIG. 4.

Crop conditioner roll 60 is driven in a counter-clockwise direction by flexible belt 46 (see FIG. 2). Roll 60 is rotatably journaled by its axial shaft 58 in plate 62. Plate 62 is pivotally mounted at one end to frame member 27 by stud 64. The second end of plate 62 is connected by pin 86 to the adjustable members 88, 89 of a motion restrictive assembly 90. The linear motion restrictive assembly is comprised of tubular member 89, a fin-like plate 88 attached to tubular member 89 as by welding, a compressive spring 98 having one end within tubular member 89 and held therein by end cap 94, a long bolt 96 whose head end engages the second end of spring 98 and whose threaded end is adjustably positioned by nuts 102 which hold the protruding end of long bolt 96 fixed with relation to hole 100 in the main frame member of the mower-conditioner. On the near face of tubular member 89, as seen in FIG. 4, is attached plate member 90. The rear edge of plate 90 is slidably engaged with protruding lip 110 which is fastened to frame member 21 of the mower-conditioner. Stud 92 protrudes from plate 90 and rotatably mounted thereon is roller sprocket 70.

Thus, for rolls 60 and 61 to separate several things must happen. First, as rolls 60 and 61 begin to separate, length L increases. Since the axis of roll 61 remains in a fixed position, an increase in L necessitates a pivotal motion of plate 62 about the centerline of stud 64. When plate 62 pivots, pin 86 will move further than does axial shaft 58, the relative movement of the two being related as the respective ratios of lengths Q and P. For the ratios depicted in the unit reduced to practice, length P is about 57 percent of length Q. Separation of rolls 60 and 61 thus causes pin 86 to move along curved arc 87.

However, since pin 86 attaches the movable end of plate 62 to finned plate member 88, any movement of the upper conditioning roll 60 away from a roll 61 has to overcome the restrictive force of spring 98. Thus, the stem crushing force exerted by the rolls on the crop is directly proportional to the compressive force exerted by spring 98. Here it is to be understood that there are matching assemblies at each end of the upper crop conditioning roll. FIG. 5 shows the upper conditioning roll 60 in silhouette, as seen from the right side of the mower-conditioner. Plate 162, spring 198, tubular member 189 and finned plate 188 are seen to be mirror images of the companion members shown in FIG. 4. Thus, there will be equal pressure exerted on both ends of the upper crop conditioning roll and, since the compressive action is the same at both ends of the roll, a description of how the left end responds should be adequate.

Power to drive the lower crop conditioning roll 61 is transferred from the belt-driven upper roll via chain 68. As shown in FIG. 4, chain 68 is comprised of four segments which have been labeled A, B, C and D. As the spacing between the crop conditioning rolls varies due to changes in the density of the crop being processed, the respective lengths of all of the chain segments will vary also, with the exception of segment C. However, since the overall length of the chain remains constant, the sum of the lengths of segments A+B+C+D must remain constant. Thus with C fixed, lengthening of D requires that the sum of lengths A+B becomes foreshortened. Using my invention the two crop conditioning rolls can be kept properly indexed by use of a constant length drive chain.

The assembly functions as follows: Separation of the crop rollers so as to increase length L causes an increase in the length of chain segment D. As the rolls separate, plate 62 pivots upward as viewed in FIG. 4. This action causes tubular member 89 to compress spring 98 and at the same time plate 90, integrally attached to tubular member 89, moves linearly upward. This action carries sprocket 70 upward along the axis of bolt 96 causing chain segment B to be fore-shortened. Protruding lip 110 allows plate 90 to move up and down in the same plane, thus keeping sprocket 70 in line with the other sprockets.

As the spacing between the rolls changes to accommodate the density of the crop, the length of chain segment A varies some but only a small amount. The change in length of segment A will be dependent on the relative leg lengths of a triangle comprising the centers of shaft 58, pin 86 and stud 92. In the main, however, it is the foreshortening of segment B which compensates for the lengthening of segment D.

As plate 62 pivots carrying pin 86 along arc 87, the compressive spring assembly held by bolt 96 can rock slightly fore and aft in hole 100. This allows the compressive forces to operate in their most stress-free state. Additionally, a lip on the bottom end of finned plate 88 has an adjustment bolt therein that in combination with bumper block 104 determines where the compressive spring assembly will bottom.

Slotted clevis 106 and frame-securing bolt 108 are used to take up the slack in chain 68. Adjustment of clevis 106 can be used to compensate for wear in the chain. Placement of sprocket 74 in the position shown in FIG. 4 assures that chain 68 makes contact with an adequate number of teeth on sprocket 72.

Referring now to FIG. 5, the means for driving the tined reel will be described. It will be recalled that the upper crop conditioning roll was driven by the flexible belt connected with the drive transmission. This means that roll 60, as viewed in FIG. 5 will be turning in a clockwise direction. Shaft 58 extends from the right-hand end of roll 60, passes through a journal in plate 162 and has on its outermost end a sprocket 120. Chain 122 couples sprocket 120 to sprocket 124 which is journaled for rotation on stub shaft 164. Stub shaft 164 also forms the pivot point for plate 162. Thus, as conditioning roll 60 moves closer to and away from the lower roll in response to changes in crop density passing therebetween, the spacing between the centers of sprockets 120 and 124 remains constant.

Idler roller 125 compensates for varying wear conditions on chain 122. Adjacent large sprocket 124 and coaxial therewith, is a small sprocket 126 which is pinned for co-rotation with sprocket 124. Chain 128 transfers driving torque from sprocket 126 to sprocket 130. Sprocket 130 is attached to and drives reel axle 132 which is journaled for rotation to the sidewalls of the mower-conditioner frame. Using the sprocket ratios shown in FIG. 5, the unit reduced to practice achieved a step down of about 10 to 1 between the rotational speed of the conditioning rolls and the tined reel.

The novel arrangement between the drive and the height control system of the mower-conditioner will now be described. A 3-point suspension is used. Two of these points are the fixed rear wheels, the right wheel 20 being viewable in FIG. 1 and the left wheel 30 being viewable in FIGS. 2 and 6. The drawbar of the tractor to which hitch 202 (see FIG. 8) attaches constitutes the third suspension point. Using the principles of my invention, a complementary power drive and height control for both the operating and the transport modes are made possible. This is accomplished as follows using FIGS. 6, 7 and 8 as one exemplary method of implementation.

Hitch 202 is at the forward end of implement tongue 26. Tongue 26 is pivotally mounted via bolt 204 to tongue subframe assembly 34. As seen in FIG. 7, tongue 26 may be locked in any one of three different horizontal positions. These are shown as detent positions 206, 208 and 210. Latching mechanism 212 locks the tongue in the chosen detent. A rope or similar flexible line allows latching mechanism 212 to be operated from the tractor. The securing of the tongue in detent 208 is intended for the transport mode since the mower-conditioner draws directly back of the tractor. The securing the tongue in detents 206 and 210 causes the mower-conditioner to draw offset from the path of the tractor.

Shelf 36 is an integral member of the tongue subframe assembly. On shelf 36 is mounted transmission 38 which interconnects power-take-off drive shaft 28 with double sheaved pulley 40. As may be seen in FIGS. 3 and 6, tongue subframe assembly 34 is pivotally attached to frame members 17 and 25 of the mower-conditioner by pins 42 and 44. Pins 42 and 44 are axially aligned with the center of the output drive shaft of transmission 38. This keeps tension on flexible belt 46 (see FIG. 2) constant for all values of cutter bar height about ground.

Extending downward and to the rear of tongue subframe assembly 34 is a triangular-shaped bracket 214 (see FIGS. 3 and 6). Near the end of bracket 214 is a hole through which pin 217 connects the bracket to clevis 215. The other end of clevis 215 is attached to one end of header flotation spring 216. The other end of spring 216 is attached via threaded bolt 218 to mower-conditioner frame member 220 by adjustable nut 222. Members 220 and 21 are parts of the same rigid frame. The tension on the header flotation spring is adjustable so that it takes a prescribed value of pressure (for example, 50 lbs.) to tilt the entire header assembly upwardly by manually lifting the push bar 24 (see FIG. 1) when the tongue hitch is connected to the drawbar of the tractor. The frame of the mower-conditioner is pre-stressed during fabrication so that the cutter bar remains parallel to ground level even though only one header flotation spring is used and it is located at the left-hand end of the mower-conditioner.

A multiplicity of skid shoes 224 maintain proper ground-shoe thrust and cutting height of the cutting bar.

During transport of the machine from one field to another, the cutter bar section of the mower-conditioner needs to be raised to provide adequate ground clearance for the underside of the mechanism. The pivotally mounted tongue subframe assembly makes this possible. Raising for transport is done by an assembly made up of U-shaped channel 230 and utility cylinder 238. In the machine reduced to practice utility cylinder 238 was hydraulically actuated. However, an electrically actuated unit would function equally as well.

U-shaped channel 230 is pivotally mounted at one end by pin 236 to bracket 232 which extends from a crossmember of tongue subframe assembly 34. The other end of U-shaped channel 230 is pivotally connected by pin 234 to a location on triangular bracket 214 which is coaxially aligned with the center of pin 236. The piston rod extending from one end of utility cylinder 238 is connected by pin 240 to a bracket extending from the throat of U-shaped channel 230. The piston rod extending from the other end of utility cylinder 238 is pivotally fastened by pin 228 to bracket 226 which extends from and is integral with framemmember 23 of the mower-conditioner.

With the utility cylinder in its unpowered or relaxed state, the relation between the tongue subframe assembly and the frame of the mower-conditioner is as shown in FIG. 2. The cutter bar is near ground level with the front edge of the header assembly lightly supported on the ground by skid shoes 224.

When it is desired to raise the header and transport the mower-conditioner to another site the utility cylinder is actuated. This pushes pin 228 further away from pin 240. This causes tongue subframe assembly 34 to rotate counter-clockwise around pins 42 and 44 to the position shown in the phantom lines of FIG. 6, while the main frame or header assembly rotates clockwise with respect to the axis of wheels 20 and 30.

Stated differently, the mower-conditioner uses a 3-point suspension comprised of wheels 20 and 30, together with the attachment point of the tongue to the drawbar of the tractor being the third. The axial line running through the centers of pins 42 and 44 is between the drawbar hitch point and the locations where wheels 20 and 30 contact the ground. Actuations of utility cylinder 238 causes the mower-conditioner to have the appearance of humping up in the middle. This is due to the fact that the plane containing pins 42 and 44 and the centers of wheels 20 and 30 rotates clockwise with respect to a second plane extending from pins 42 and 44 through the drawbar of the tractor when the piston rods of utility cylinder 238 are extended.

Releasing utility cylinder 238 to its unpowered position causes the tongue subframe assembly to rotate back such that tension forces are again applied by header flotation spring 216 to cause the cutter bar support assembly to lightly contact the ground. Pressure of contact with the ground is a function of spring tension which can be adjusted by the operator.

It will be understood that the invention is not limited by the specific embodiment disclosed in the drawings. Various modifications can be made with regard to particular structures without limiting the scope of this invention which is set forth in the following claims.

Having thus described my invention, what is claimed is:

1. A crop harvesting and conditioning machine of the type adapted to be drawn by a tractor having a power take-off, comprising:

a transversely arranged header assembly including a main frame, rearwardly positioned support wheels, and a sickle mower positioned along the front of said frame;

a tongue subframe, a pivotal mount between said subframe and one end of said main frame sidewalls and having at its other end a drawbar coupling having provision for attachment to said tractor;

a pair of crop conditioning rolls rotatably mounted relative to said main frame on generally transverse axes above and behind said mower, each roll having a shaft extending axially outward therefrom, said shafts allowing rotatable journalling of said rolls to said machine;

lever arm plates swingably mounted on the sidewalls of the main frame, the lower of said rolls being journaled on a fixed axis relative to said main frame and the upper of said rolls being journaled at its ends on said lever arm plates;

spring means adjacent each end of said upper crop conditioning roll for exerting a compressive force urging the crop conditioning rolls together, one end of each of said spring means being anchored to said frame, the other end of each of said spring means being attached to the swingable end of one of said lever arm plates;

a transmission mounted on said subframe and coupled to said power take-off, said transmission including an output element having an axis coaxial with said pivot;

belt drive means for transferring power from said output element to said upper crop conditioning roll, said belt drive means including a pulley attached to the axially extending shaft on the end of said upper crop conditioning roll; and an arrangement of means for utilizing said upper crop conditioning roll to drive said lower crop conditioning roll, said arrangement of means comprising:

a driving sprocket on the outward extending shaft of said upper crop conditioning roll, a driven sprocket on the outward extending shaft of said lower crop conditioning roll, a yieldably restricted slide element attached to one of said spring means and moving in synchronism with any displacement of the companion lever arm plate, a plurality of chain positioning elements of which one is rotatably mounted on said slide element, and an endless chain entrained around said sprockets and chain positioning elements, said one chain positioning element being both within the chain periphery and secured to said slide to move linearly to compensate for sprocket chain slack variation introduced as said crop conditioning rolls are separated in response to varying amounts of crop material passing therebetween.

2. The crop harvesting and conditioning machine as recited in claim 1 wherein said chain positioning elements include a pair of idler sprockets, the first of said idler sprockets being rotatably mounted on said slide element, the second of said idler sprockets being rotatably mounted on said frame sidewall, said pair of idler sprockets being in the same vertical plane as the driving sprocket and having a positional relation thereto as the base corners to the apex of a triangle, said driven sprocket being positioned between said pair of idler sprockets, the entrainment of said endless chain around said driven sprocket being such as to drive said lower crop conditioning roll in a direction opposite to that of the upper crop conditioning roll.

3. A crop harvesting and conditioning machine as recited in claim 1 including means for driving said sickle mower from one end of said lower crop conditioning roll.

4. The invention as defined in claim 3 including both a crop gathering reel transversely mounted on said frame above said sickle mower and forwardly of said crop conditioning rolls and operative to transfer crop cuttings from said sickle mower to said rolls, and connecting means for driving said crop gathering reel from one end of said upper crop conditioning roll.

5. A crop harvesting and conditioning machine as recited in claim 1 wherein said tongue subframe includes suspension regulating means for controlling the height of the sickle mower above ground by rotational adjustment of the relationship of said tongue subframe with respect to said main frame of the mower conditioner, said rotational adjustment being around said subframe pivotal mount.

6. The invention as defined in claim 5 wherein said suspension regulating means comprises:

a triangular-shaped bracket extending downward and to the rear of the tongue subframe assembly; and a header flotation spring connected at one end to said bracket, the other end of said spring being attached via a threaded bolt to the main frame of the machine, the tension on said header flotation spring being adjustable so that a prescribed value of lifting pressure applied at the front of the header assembly will cause said header assembly to tilt upward.

7. The invention as defined in claim 6 including hydraulically actuated means for raising said header assembly to a transport position by causing said tongue subframe assembly to rotate counter-clockwise with respect to said header assembly, said rotation being accomplished at said pivotal mount point between said tongue subframe assembly and said frame sidewall.

* * * * *